(12) United States Patent
Birmingham

(10) Patent No.: US 8,848,825 B2
(45) Date of Patent: Sep. 30, 2014

(54) ECHO CANCELLATION IN WIRELESS INBAND SIGNALING MODEM

(75) Inventor: Kiley Birmingham, Seattle, WA (US)

(73) Assignee: Airbiquity Inc., Seattle, WA (US)

(*) Notice: Subject to any disclaimer, the term of this patent is extended or adjusted under 35 U.S.C. 154(b) by 359 days.

(21) Appl. No.: 13/240,956

(22) Filed: Sep. 22, 2011

(65) Prior Publication Data

US 2013/0077712 A1   Mar. 28, 2013

(51) Int. Cl.
*H04K 1/02*     (2006.01)
*H04L 25/03*    (2006.01)
*H04L 25/49*    (2006.01)
*H04B 3/23*     (2006.01)

(52) U.S. Cl.
CPC ........................................ *H04B 3/23* (2013.01)
USPC ........... 375/296; 375/222; 375/220; 375/219; 375/285; 455/456.1; 370/252; 370/286

(58) Field of Classification Search
USPC .......................... 375/296, 219, 220, 222, 285; 455/422.1, 456.1; 370/252, 286
See application file for complete search history.

(56) References Cited

U.S. PATENT DOCUMENTS

| | | |
|---|---|---|
| 3,742,197 A | 6/1973 | Pommerening |
| 3,742,463 A | 6/1973 | Haselwood |
| 3,971,888 A | 7/1976 | Ching |
| 3,984,814 A | 10/1976 | Bailey, Jr. |
| 3,985,965 A | 10/1976 | Field |
| 4,158,748 A | 6/1979 | En |
| 4,218,654 A | 8/1980 | Ogawa |
| 4,310,722 A | 1/1982 | Schaible |
| 4,355,310 A | 10/1982 | Belaigues |
| 4,368,987 A | 1/1983 | Waters |
| 4,494,114 A | 1/1985 | Kaish |
| 4,494,211 A | 1/1985 | Schwartz |
| 4,539,557 A | 9/1985 | Redshaw |
| 4,577,343 A | 3/1986 | Oura |
| 4,595,950 A | 6/1986 | Lofberg |

(Continued)

FOREIGN PATENT DOCUMENTS

| | | |
|---|---|---|
| CA | 2242495 | 1/2000 |
| DE | 44 24 412 A1 | 1/1996 |

(Continued)

OTHER PUBLICATIONS

Stolowitz Ford Cowger LLP List of Related Cases dated Dec. 23, 2011.

(Continued)

*Primary Examiner* — Phuong Phu
(74) *Attorney, Agent, or Firm* — Stolowitz Ford Cowger LLP

(57) ABSTRACT

An inband signaling modem receives digital user data for transmission to a remote location, via wireless and land line telecommunication networks. The modem converts the user data into audio tones for transmission, and encodes the audio tones into digital form suitable for transmission through a voice channel call session of a digital wireless network. After establishing a voice channel call session on a digital wireless network, the modem disables any echo cancellation or echo suppression means that may be encountered in the voice channel call session; and then transmits the user data audio tones. Preferably, disabling the echo cancellation or echo suppression means comprises transmitting a predetermined tone in the voice channel call session. Further, the modem preferably repeats the tone, to again disable echo cancellation or echo suppression means, at the beginning of each data burst during the call session.

15 Claims, 1 Drawing Sheet

(56) References Cited

U.S. PATENT DOCUMENTS

| | | |
|---|---|---|
| 4,598,272 A | 7/1986 | Cox |
| 4,599,583 A | 7/1986 | Shimozono |
| 4,607,257 A | 8/1986 | Noguchi |
| 4,630,301 A | 12/1986 | Hohl |
| 4,641,323 A | 2/1987 | Tsang |
| 4,651,157 A | 3/1987 | Gray |
| 4,656,463 A | 4/1987 | Anders |
| 4,675,656 A | 6/1987 | Narcisse |
| 4,685,131 A | 8/1987 | Horne |
| 4,750,197 A | 6/1988 | Denekamp |
| 4,754,255 A | 6/1988 | Sanders |
| 4,766,589 A | 8/1988 | Fisher |
| 4,776,003 A | 10/1988 | Harris |
| 4,817,089 A | 3/1989 | Paneth |
| 4,831,647 A | 5/1989 | D'Avello |
| 4,860,336 A | 8/1989 | D'Avello |
| 4,914,651 A | 4/1990 | Lusignan |
| 4,918,425 A | 4/1990 | Greenberg |
| 4,918,717 A | 4/1990 | Bissonnette |
| 4,926,444 A | 5/1990 | Hamilton |
| 4,941,155 A | 7/1990 | Chuang |
| 4,965,821 A | 10/1990 | Bishop |
| 4,977,609 A | 12/1990 | McClure |
| 4,984,238 A | 1/1991 | Watanabe |
| 5,014,344 A | 5/1991 | Goldberg |
| 5,025,455 A | 6/1991 | Nguyen |
| 5,036,537 A | 7/1991 | Jeffers |
| 5,040,214 A | 8/1991 | Grossberg et al. |
| 5,043,736 A | 8/1991 | Darnell |
| 5,081,667 A | 1/1992 | Drori |
| 5,095,307 A | 3/1992 | Shimura |
| 5,119,403 A | 6/1992 | Krishnan |
| 5,119,504 A | 6/1992 | Durboraw, III |
| 5,134,644 A | 7/1992 | Garton |
| 5,155,689 A | 10/1992 | Wortham |
| 5,191,611 A | 3/1993 | Lang |
| 5,201,071 A | 4/1993 | Webb |
| 5,203,012 A | 4/1993 | Patsiokas |
| 5,208,446 A | 5/1993 | Martinez |
| 5,212,831 A | 5/1993 | Chuang |
| 5,214,556 A | 5/1993 | Kilbel |
| 5,218,618 A | 6/1993 | Sagey |
| 5,223,844 A | 6/1993 | Mansell |
| 5,227,776 A | 7/1993 | Starefoss |
| 5,235,633 A | 8/1993 | Dennison |
| 5,245,634 A | 9/1993 | Averbuch |
| 5,245,647 A | 9/1993 | Grouffal |
| 5,272,747 A | 12/1993 | Meads |
| 5,282,204 A | 1/1994 | Shpancer |
| 5,289,372 A | 2/1994 | Guthrie |
| 5,301,353 A | 4/1994 | Borras |
| 5,301,359 A | 4/1994 | Van Den Heuvel |
| 5,305,384 A | 4/1994 | Ashby, III |
| 5,317,309 A | 5/1994 | Vercellotti |
| 5,331,635 A | 7/1994 | Ota |
| 5,333,175 A | 7/1994 | Ariyavisitakul |
| 5,334,974 A | 8/1994 | Simms |
| 5,347,272 A | 9/1994 | Ota |
| 5,363,375 A | 11/1994 | Chuang |
| 5,363,376 A | 11/1994 | Chuang |
| 5,365,450 A | 11/1994 | Schuchman |
| 5,365,577 A | 11/1994 | Davis |
| 5,379,224 A | 1/1995 | Brown |
| 5,381,129 A | 1/1995 | Boardman |
| 5,388,147 A | 2/1995 | Grimes |
| 5,388,247 A | 2/1995 | Goodwin |
| 5,389,934 A | 2/1995 | Kass |
| 5,390,216 A | 2/1995 | Bilitza |
| 5,396,539 A | 3/1995 | Slekys |
| 5,396,653 A | 3/1995 | Kivari |
| 5,408,684 A | 4/1995 | Yunoki |
| 5,410,541 A | 4/1995 | Hotto |
| 5,410,739 A | 4/1995 | Hart |
| 5,414,432 A | 5/1995 | Penny, Jr. |
| 5,418,537 A | 5/1995 | Bird |
| 5,420,592 A | 5/1995 | Johnson |
| 5,422,816 A | 6/1995 | Sprague |
| 5,428,636 A | 6/1995 | Meier |
| 5,438,337 A | 8/1995 | Aguado |
| 5,440,491 A | 8/1995 | Kawano |
| 5,448,622 A | 9/1995 | Huttunen |
| 5,450,130 A | 9/1995 | Foley |
| 5,458,469 A | 10/1995 | Hauser |
| 5,459,469 A | 10/1995 | Schuchman et al. |
| 5,461,390 A | 10/1995 | Hoshen |
| 5,475,864 A | 12/1995 | Hamabe |
| 5,475,868 A | 12/1995 | Duque-Anton |
| 5,479,480 A | 12/1995 | Scott |
| 5,479,482 A | 12/1995 | Grimes |
| 5,483,549 A | 1/1996 | Weinberg |
| 5,491,690 A | 2/1996 | Alfonsi |
| 5,497,149 A | 3/1996 | Fast |
| 5,504,491 A | 4/1996 | Chapman |
| 5,504,833 A | 4/1996 | George |
| 5,506,888 A | 4/1996 | Hayes |
| 5,509,035 A | 4/1996 | Teidemann, Jr. |
| 5,510,797 A | 4/1996 | Abraham |
| 5,513,111 A | 4/1996 | Wortham |
| 5,515,043 A | 5/1996 | Berard |
| 5,519,403 A | 5/1996 | Bickley |
| 5,519,621 A | 5/1996 | Wortham |
| 5,528,232 A | 6/1996 | Verma |
| 5,530,701 A | 6/1996 | Stillman |
| 5,533,121 A | 7/1996 | Suzuki |
| 5,537,458 A | 7/1996 | Suomi |
| 5,539,810 A | 7/1996 | Kennedy, III |
| 5,543,789 A | 8/1996 | Behr |
| 5,544,222 A | 8/1996 | Robinson |
| 5,544,225 A | 8/1996 | Kennedy, III |
| 5,546,445 A | 8/1996 | Dennison |
| 5,550,551 A | 8/1996 | Alesio |
| 5,551,066 A | 8/1996 | Stillman |
| 5,555,286 A | 9/1996 | Tendler |
| 5,555,520 A | 9/1996 | Sudo |
| 5,557,254 A | 9/1996 | Johnson |
| 5,565,858 A | 10/1996 | Guthrie |
| 5,566,173 A | 10/1996 | Steinbrecher |
| 5,572,204 A | 11/1996 | Timm |
| 5,576,716 A | 11/1996 | Sadler |
| 5,587,715 A | 12/1996 | Lewis |
| 5,590,396 A | 12/1996 | Henry |
| 5,594,425 A | 1/1997 | Ladner |
| RE35,498 E | 4/1997 | Barnard |
| 5,619,684 A | 4/1997 | Goodwin |
| 5,621,388 A | 4/1997 | Sherburne |
| 5,625,668 A | 4/1997 | Loomis |
| 5,627,517 A | 5/1997 | Theimer |
| 5,630,206 A | 5/1997 | Urban |
| 5,635,450 A | 6/1997 | Mayer |
| 5,637,355 A | 6/1997 | Stanforth |
| 5,640,444 A | 6/1997 | O'Sullivan |
| 5,650,770 A | 7/1997 | Schlager |
| 5,663,734 A | 9/1997 | Krasner |
| 5,666,357 A | 9/1997 | Jangi |
| 5,668,803 A | 9/1997 | Tymes |
| 5,673,305 A | 9/1997 | Ross |
| 5,680,439 A | 10/1997 | Aguilera |
| 5,686,910 A | 11/1997 | Timm |
| 5,687,215 A | 11/1997 | Timm |
| 5,687,216 A | 11/1997 | Svensson |
| 5,691,980 A | 11/1997 | Welles, II |
| 5,703,598 A | 12/1997 | Emmons |
| 5,711,013 A | 1/1998 | Collett |
| 5,712,619 A | 1/1998 | Simkin |
| 5,712,899 A | 1/1998 | Pace, II |
| 5,719,883 A | 2/1998 | Ayanoglu |
| 5,724,243 A | 3/1998 | Westerlage |
| 5,726,893 A | 3/1998 | Schuchman |
| 5,726,984 A | 3/1998 | Kubler |
| 5,731,757 A | 3/1998 | Layson, Jr. |
| 5,732,326 A | 3/1998 | Maruyama |
| 5,734,981 A | 3/1998 | Kennedy, III |
| 5,742,233 A | 4/1998 | Hoffman |
| 5,748,083 A | 5/1998 | Rietkerk |

(56) References Cited

U.S. PATENT DOCUMENTS

| | | |
|---|---|---|
| 5,748,084 A | 5/1998 | Isikoff |
| 5,751,246 A | 5/1998 | Hertel |
| 5,752,186 A | 5/1998 | Malackowski |
| 5,752,193 A | 5/1998 | Scholefield |
| 5,752,195 A | 5/1998 | Tsuji |
| 5,754,554 A | 5/1998 | Nakahara |
| 5,754,589 A | 5/1998 | Maitra |
| D395,250 S | 6/1998 | Kabler |
| 5,761,204 A | 6/1998 | Grob |
| 5,761,292 A | 6/1998 | Wagner |
| 5,771,001 A | 6/1998 | Cobb |
| 5,771,455 A | 6/1998 | Kennedy, III |
| 5,774,876 A | 6/1998 | Woolley |
| 5,778,024 A | 7/1998 | McDonough |
| 5,781,156 A | 7/1998 | Krasner |
| 5,784,422 A | 7/1998 | Heermann |
| 5,786,789 A | 7/1998 | Janky |
| 5,790,842 A | 8/1998 | Charles |
| 5,794,124 A | 8/1998 | Ito |
| 5,796,808 A | 8/1998 | Scott |
| 5,797,091 A | 8/1998 | Clise |
| 5,804,810 A | 9/1998 | Woolley |
| 5,805,576 A | 9/1998 | Worley, III |
| 5,812,087 A | 9/1998 | Krasner |
| 5,812,522 A | 9/1998 | Lee |
| 5,812,786 A | 9/1998 | Seazholtz |
| 5,815,114 A | 9/1998 | Speasl |
| RE35,916 E | 10/1998 | Dennison |
| 5,825,283 A | 10/1998 | Camhi |
| 5,825,327 A | 10/1998 | Krasner |
| 5,826,188 A | 10/1998 | Tayloe |
| 5,831,574 A | 11/1998 | Krasner |
| 5,832,394 A | 11/1998 | Wortham |
| 5,835,907 A | 11/1998 | Newman |
| 5,838,237 A | 11/1998 | Revell |
| 5,841,396 A | 11/1998 | Krasner |
| 5,841,842 A | 11/1998 | Baum |
| 5,842,141 A | 11/1998 | Vaihoja |
| 5,850,392 A | 12/1998 | Wang |
| 5,856,986 A | 1/1999 | Sobey |
| 5,864,578 A | 1/1999 | Yuen |
| 5,864,763 A | 1/1999 | Leung |
| 5,870,675 A | 2/1999 | Tuutijarvi |
| 5,874,914 A | 2/1999 | Krasner |
| 5,881,069 A | 3/1999 | Cannon |
| 5,881,373 A | 3/1999 | Elofsson |
| 5,884,214 A | 3/1999 | Krasner |
| 5,886,634 A | 3/1999 | Muhme |
| 5,890,108 A | 3/1999 | Yeldener |
| 5,892,441 A | 4/1999 | Woolley |
| 5,892,454 A | 4/1999 | Schipper |
| 5,901,179 A | 5/1999 | Urabe |
| 5,911,129 A | 6/1999 | Towell |
| 5,912,886 A | 6/1999 | Takahashi |
| 5,913,170 A | 6/1999 | Wortham |
| 5,915,210 A | 6/1999 | Cameron |
| 5,917,449 A | 6/1999 | Sanderford |
| 5,918,180 A | 6/1999 | Dimino |
| 5,930,340 A | 7/1999 | Bell |
| 5,930,722 A | 7/1999 | Han |
| 5,933,468 A | 8/1999 | Kingdon |
| 5,936,526 A | 8/1999 | Klein |
| 5,937,355 A | 8/1999 | Joong |
| 5,940,598 A | 8/1999 | Strauss |
| 5,945,944 A | 8/1999 | Krasner |
| 5,946,304 A | 8/1999 | Chapman |
| 5,946,611 A | 8/1999 | Dennison |
| 5,949,335 A | 9/1999 | Maynard |
| 5,953,694 A | 9/1999 | Pillekamp |
| 5,960,363 A | 9/1999 | Mizikovsky |
| 5,961,608 A | 10/1999 | Onosaka |
| 5,963,130 A | 10/1999 | Schlager |
| 5,963,134 A | 10/1999 | Bowers |
| 5,970,130 A | 10/1999 | Katko |
| 5,978,676 A | 11/1999 | Guridi |
| 5,991,279 A | 11/1999 | Haugli |
| 5,999,124 A | 12/1999 | Sheynblat |
| 5,999,126 A | 12/1999 | Ito |
| 6,002,363 A | 12/1999 | Krasner |
| 6,006,189 A | 12/1999 | Strawczynski |
| 6,009,325 A | 12/1999 | Retzer |
| 6,009,338 A | 12/1999 | Iwata |
| 6,011,973 A | 1/2000 | Valentine |
| 6,014,089 A | 1/2000 | Tracy |
| 6,014,090 A | 1/2000 | Rosen |
| 6,014,376 A | 1/2000 | Abreu |
| 6,018,654 A | 1/2000 | Valentine |
| 6,021,163 A | 2/2000 | Hoshi |
| 6,024,142 A | 2/2000 | Bates |
| 6,031,489 A | 2/2000 | Wyrwas |
| 6,032,037 A | 2/2000 | Jeffers |
| 6,038,310 A | 3/2000 | Hollywood |
| 6,038,595 A | 3/2000 | Ortony |
| 6,041,124 A | 3/2000 | Sugita |
| 6,044,257 A | 3/2000 | Boling |
| 6,046,971 A | 4/2000 | Ogasawara |
| 6,049,971 A | 4/2000 | Petit |
| 6,055,434 A | 4/2000 | Seraj |
| 6,057,756 A | 5/2000 | Engellenner |
| 6,067,044 A | 5/2000 | Whelan |
| 6,067,457 A | 5/2000 | Erickson |
| 6,069,570 A | 5/2000 | Herring |
| 6,070,089 A | 5/2000 | Brophy |
| 6,075,458 A | 6/2000 | Ladner |
| 6,076,099 A | 6/2000 | Chen |
| 6,081,523 A | 6/2000 | Merchant |
| 6,091,969 A | 7/2000 | Brophy |
| 6,097,760 A | 8/2000 | Spicer |
| 6,101,395 A | 8/2000 | Keshavachar |
| 6,121,922 A | 9/2000 | Mohan |
| 6,122,271 A | 9/2000 | McDonald |
| 6,122,514 A | 9/2000 | Spaur |
| 6,131,067 A | 10/2000 | Girerd |
| 6,131,366 A | 10/2000 | Fukuda |
| 6,133,874 A | 10/2000 | Krasner |
| 6,140,956 A | 10/2000 | Hillman |
| 6,144,336 A | 11/2000 | Preston |
| 6,151,493 A | 11/2000 | Sasakura |
| 6,154,658 A | 11/2000 | Caci |
| 6,166,688 A | 12/2000 | Cromer |
| 6,169,497 B1 | 1/2001 | Robert |
| 6,173,194 B1 | 1/2001 | Vanttila |
| 6,175,307 B1 | 1/2001 | Peterson |
| 6,181,253 B1 | 1/2001 | Eschenbach |
| 6,195,736 B1 | 2/2001 | Lisle |
| 6,208,959 B1 | 3/2001 | Jonsson |
| 6,212,207 B1 | 4/2001 | Nicholas |
| 6,212,374 B1 * | 4/2001 | Scott et al. ............... 455/422.1 |
| 6,226,529 B1 | 5/2001 | Bruno |
| 6,236,652 B1 | 5/2001 | Preston |
| 6,249,227 B1 | 6/2001 | Brady |
| 6,266,008 B1 | 7/2001 | Huston |
| 6,269,392 B1 | 7/2001 | Cotichini |
| 6,272,315 B1 | 8/2001 | Chang |
| 6,275,990 B1 | 8/2001 | Dapper |
| 6,282,430 B1 | 8/2001 | Young |
| 6,288,645 B1 | 9/2001 | McCall |
| 6,295,461 B1 | 9/2001 | Palmer |
| 6,300,863 B1 | 10/2001 | Cotichini |
| 6,300,875 B1 | 10/2001 | Schafer |
| 6,301,480 B1 | 10/2001 | Kennedy, III |
| 6,304,186 B1 | 10/2001 | Rabanne |
| 6,304,637 B1 | 10/2001 | Mirashrafi |
| 6,307,471 B1 | 10/2001 | Xydis |
| 6,308,060 B2 | 10/2001 | Wortham |
| 6,320,535 B1 | 11/2001 | Hillman |
| 6,321,091 B1 | 11/2001 | Holland |
| 6,326,736 B1 | 12/2001 | Kang |
| 6,327,533 B1 | 12/2001 | Chou |
| 6,343,217 B1 | 1/2002 | Borland |
| 6,345,251 B1 | 2/2002 | Jansson |
| 6,351,495 B1 | 2/2002 | Tarraf |
| 6,358,145 B1 | 3/2002 | Wong |
| 6,359,923 B1 | 3/2002 | Agee |

(56) References Cited

U.S. PATENT DOCUMENTS

| | | |
|---|---|---|
| 6,362,736 B1 | 3/2002 | Gehlot |
| 6,373,842 B1 | 4/2002 | Coverdale |
| 6,405,033 B1 | 6/2002 | Kennedy, III |
| 6,430,162 B1 | 8/2002 | Reese |
| 6,430,176 B1 | 8/2002 | Christie, IV |
| 6,434,198 B1 | 8/2002 | Tarraf |
| 6,466,582 B2 | 10/2002 | Venters |
| 6,470,046 B1 | 10/2002 | Scott |
| 6,477,633 B1 | 11/2002 | Grimmett |
| 6,493,338 B1 | 12/2002 | Preston |
| 6,516,198 B1 | 2/2003 | Tendler |
| 6,519,260 B1 | 2/2003 | Galyas |
| 6,522,265 B1 | 2/2003 | Hillman |
| 6,526,026 B1 | 2/2003 | Menon |
| 6,529,744 B1 | 3/2003 | Birkler |
| 6,545,988 B1 | 4/2003 | Skog |
| 6,611,804 B1 | 8/2003 | Dörbecker |
| 6,614,349 B1 | 9/2003 | Proctor |
| 6,617,979 B2 | 9/2003 | Yoshioka |
| 6,628,967 B1 | 9/2003 | Yue |
| 6,665,333 B2 | 12/2003 | McCrady |
| 6,677,894 B2 | 1/2004 | Sheynblat |
| 6,681,121 B1 | 1/2004 | Preston |
| 6,683,855 B1 | 1/2004 | Bordogna |
| 6,690,681 B1 | 2/2004 | Preston |
| 6,690,922 B1 | 2/2004 | Lindemann |
| 6,697,987 B2 | 2/2004 | Lee |
| 6,700,867 B2 | 3/2004 | Classon |
| 6,707,421 B1 | 3/2004 | Drury |
| 6,747,571 B2 | 6/2004 | Fierro |
| 6,754,265 B1 | 6/2004 | Lindemann |
| 6,771,629 B1 | 8/2004 | Preston |
| 6,778,645 B1 | 8/2004 | Rao |
| 6,799,050 B1 | 9/2004 | Krasner |
| 6,836,515 B1 | 12/2004 | Kay |
| 6,845,153 B2 | 1/2005 | Tiburtius |
| 6,917,449 B2 | 7/2005 | Nakajima |
| 6,940,809 B2 | 9/2005 | Sun |
| 6,981,022 B2 | 12/2005 | Boundy |
| 6,993,362 B1 | 1/2006 | Aberg |
| 7,092,370 B2 | 8/2006 | Jiang |
| 7,103,550 B2 | 9/2006 | Gallagher |
| 7,151,768 B2 | 12/2006 | Preston |
| 7,164,662 B2 | 1/2007 | Preston |
| 7,206,305 B2 | 4/2007 | Preston |
| 7,206,574 B2 | 4/2007 | Bright |
| 7,215,965 B2 | 5/2007 | Fournier |
| 7,221,669 B2 | 5/2007 | Preston |
| 7,269,188 B2 | 9/2007 | Smith |
| 7,283,904 B2 | 10/2007 | Benjamin |
| 7,286,522 B2 | 10/2007 | Preston |
| 7,317,696 B2 | 1/2008 | Preston |
| 7,372,833 B2 | 5/2008 | Kyrönaho |
| 7,398,100 B2 | 7/2008 | Harris |
| 7,426,466 B2 | 9/2008 | Ananthapadmanabhan |
| 7,430,428 B2 | 9/2008 | Van Bosch |
| 7,477,906 B2 | 1/2009 | Radic |
| 7,483,418 B2 | 1/2009 | Maurer |
| 7,508,810 B2 | 3/2009 | Moinzadeh |
| 7,511,611 B2 | 3/2009 | Sabino |
| 7,512,098 B2 | 3/2009 | Jiang |
| 7,562,393 B2 | 7/2009 | Buddhikot |
| 7,583,621 B2 * | 9/2009 | Qi et al. .................. 370/286 |
| 7,583,959 B2 | 9/2009 | Holmes |
| 7,586,240 B2 | 9/2009 | Tsuda |
| 7,593,449 B2 | 9/2009 | Shattil |
| 7,606,555 B2 | 10/2009 | Walsh |
| 7,609,646 B1 * | 10/2009 | Qi et al. .................. 370/252 |
| 7,653,383 B2 | 1/2010 | Natarajan |
| 7,688,260 B2 | 3/2010 | Pomerantz |
| 7,701,954 B2 | 4/2010 | Rabenko |
| 7,733,853 B2 | 6/2010 | Moinzadeh |
| 7,747,281 B2 | 6/2010 | Preston |
| 7,809,367 B2 | 10/2010 | Hellaker |
| 7,848,358 B2 | 12/2010 | LaDue |
| 7,848,763 B2 | 12/2010 | Fournier |
| 7,856,240 B2 | 12/2010 | Gunn |
| 7,924,934 B2 | 4/2011 | Birmingham |
| 7,979,095 B2 | 7/2011 | Birmingham |
| 7,983,310 B2 | 7/2011 | Hirano |
| 8,036,201 B2 | 10/2011 | Moinzadeh |
| 8,036,600 B2 | 10/2011 | Garrett |
| 8,068,792 B2 | 11/2011 | Preston |
| 8,073,440 B2 | 12/2011 | Quimby et al. |
| 8,194,526 B2 | 6/2012 | Madhavan |
| 8,195,093 B2 | 6/2012 | Garrett |
| 8,249,865 B2 | 8/2012 | Birmingham |
| 8,346,227 B2 | 1/2013 | Quimby |
| 8,369,393 B2 | 2/2013 | Birmingham |
| 8,418,039 B2 | 4/2013 | Birmingham |
| 8,452,247 B2 | 5/2013 | Quimby |
| 8,594,138 B2 | 11/2013 | Hirano |
| 2002/0015424 A1 | 2/2002 | Preston |
| 2002/0022465 A1 | 2/2002 | McCullagh |
| 2002/0071432 A1 | 6/2002 | Soderberg |
| 2002/0093924 A1 | 7/2002 | Preston |
| 2002/0093990 A1 | 7/2002 | Preston |
| 2002/0097706 A1 | 7/2002 | Preston |
| 2002/0111167 A1 | 8/2002 | Nguyen |
| 2002/0122401 A1 | 9/2002 | Xiang |
| 2002/0172193 A1 | 11/2002 | Preston |
| 2002/0181446 A1 | 12/2002 | Preston |
| 2003/0016639 A1 | 1/2003 | Kransmo |
| 2003/0206625 A9 | 11/2003 | Ahmad |
| 2003/0212562 A1 | 11/2003 | Patel |
| 2003/0227939 A1 | 12/2003 | Yukie |
| 2004/0034529 A1 | 2/2004 | Hooper, III |
| 2004/0192345 A1 | 9/2004 | Osborn |
| 2005/0033511 A1 | 2/2005 | Pechatnikov |
| 2005/0090225 A1 | 4/2005 | Muehleisen |
| 2005/0111563 A1 | 5/2005 | Tseng |
| 2005/0147057 A1 | 7/2005 | LaDue |
| 2005/0187882 A1 | 8/2005 | Sovio |
| 2005/0207511 A1 | 9/2005 | Madhavan |
| 2005/0215228 A1 | 9/2005 | Fostick |
| 2005/0226202 A1 | 10/2005 | Zhang |
| 2005/0278169 A1 | 12/2005 | Hardwick |
| 2006/0019713 A1 | 1/2006 | Rokusek |
| 2006/0059261 A1 | 3/2006 | Finkenzeller |
| 2006/0246910 A1 | 11/2006 | Petermann |
| 2006/0287003 A1 | 12/2006 | Moinzadeh |
| 2007/0087756 A1 | 4/2007 | Hoffberg |
| 2007/0124625 A1 | 5/2007 | Hassan |
| 2007/0155360 A1 | 7/2007 | An |
| 2007/0162834 A1 | 7/2007 | Banerjee |
| 2007/0211624 A1 | 9/2007 | Schmidt |
| 2007/0253562 A1 | 11/2007 | Kite |
| 2007/0258398 A1 | 11/2007 | Chesnutt |
| 2007/0264964 A1 | 11/2007 | Birmingham |
| 2008/0025295 A1 | 1/2008 | Elliott |
| 2008/0039017 A1 | 2/2008 | Kim |
| 2008/0056469 A1 | 3/2008 | Preston |
| 2008/0107094 A1 | 5/2008 | Borella |
| 2008/0108389 A1 | 5/2008 | Preston |
| 2008/0132200 A1 | 6/2008 | Shinoda |
| 2008/0140394 A1 | 6/2008 | Holmes |
| 2008/0143497 A1 | 6/2008 | Wasson |
| 2008/0182570 A1 | 7/2008 | Kuhl |
| 2008/0212820 A1 | 9/2008 | Park |
| 2008/0266064 A1 | 10/2008 | Curran |
| 2008/0294340 A1 | 11/2008 | Schmidt |
| 2009/0055516 A1 | 2/2009 | Zhodzishsky |
| 2009/0077407 A1 | 3/2009 | Akimoto |
| 2009/0088180 A1 | 4/2009 | LaMance |
| 2009/0110033 A1 | 4/2009 | Shattil |
| 2009/0117947 A1 | 5/2009 | Birmingham |
| 2009/0149196 A1 | 6/2009 | Fournier |
| 2009/0154444 A1 | 6/2009 | Moinzadeh |
| 2009/0265173 A1 | 10/2009 | Madhavan |
| 2009/0298428 A1 | 12/2009 | Shin |
| 2009/0304057 A1 | 12/2009 | Werner |
| 2009/0306976 A1 | 12/2009 | Joetten |
| 2010/0067565 A1 | 3/2010 | Hirano |
| 2010/0197322 A1 * | 8/2010 | Preston et al. .............. 455/456.1 |

(56) References Cited

U.S. PATENT DOCUMENTS

| | | |
|---|---|---|
| 2010/0202435 A1 | 8/2010 | Moinzadeh |
| 2010/0211660 A1 | 8/2010 | Kiss |
| 2010/0273422 A1 | 10/2010 | Garrett |
| 2010/0273470 A1 | 10/2010 | Quimby |
| 2011/0029832 A1 | 2/2011 | Birmingham |
| 2011/0125488 A1 | 5/2011 | Birmingham |
| 2011/0211625 A1 | 9/2011 | Birmingham |
| 2011/0287736 A1 | 11/2011 | Hirano |
| 2011/0312322 A1 | 12/2011 | Garrett |
| 2012/0040651 A1 | 2/2012 | Quimby |
| 2013/0095841 A1 | 4/2013 | Quimby |

FOREIGN PATENT DOCUMENTS

| | | |
|---|---|---|
| DE | 199 48 966 A1 | 4/2000 |
| EP | 0050082 A1 | 10/1981 |
| EP | 0 242 099 A2 | 10/1987 |
| EP | 0 528 090 A1 | 8/1991 |
| EP | 0 512 789 A2 | 5/1992 |
| EP | 0 501 058 A2 | 9/1992 |
| EP | 0 545 753 A1 | 6/1993 |
| EP | 0 545 783 A1 | 6/1993 |
| EP | 0 580 397 A2 | 1/1994 |
| EP | 0 889 610 A2 | 1/1999 |
| EP | 0 896 442 A1 | 2/1999 |
| EP | 1 093 253 A2 | 4/2001 |
| EP | 1 329 693 A2 | 7/2003 |
| EP | 01 950 402 | 12/2004 |
| EP | 1 843 503 A2 | 10/2007 |
| GB | 2 290 005 A | 5/1994 |
| JP | 03232349 | 10/1991 |
| JP | 5130008 | 5/1993 |
| JP | 05-207107 | 8/1993 |
| JP | 5252099 | 9/1993 |
| JP | 6077887 | 3/1994 |
| JP | 06188849 A1 | 7/1994 |
| JP | 8-293832 A | 11/1996 |
| JP | 09-259391 | 9/1997 |
| JP | 09261281 A1 | 10/1997 |
| JP | 10-215328 | 7/1998 |
| JP | 10-232138 | 8/1998 |
| JP | 11109062 | 4/1999 |
| JP | 11-312285 | 11/1999 |
| JP | 2000-68925 | 3/2000 |
| JP | P3044064 | 3/2000 |
| JP | 2001-211189 | 7/2001 |
| JP | 2001-238256 | 8/2001 |
| JP | 2002-181921 A | 6/2002 |
| JP | 2004264224 A | 9/2004 |
| JP | 2004282792 A | 10/2004 |
| JP | 2008507940 A | 3/2008 |
| TW | 2010/18163 A | 5/2010 |
| WO | WO 89/12835 A1 | 12/1989 |
| WO | WO 91/07044 A1 | 5/1991 |
| WO | WO 95/21511 A1 | 8/1995 |
| WO | WO 96/07110 A1 | 3/1996 |
| WO | WO 96/15636 A1 | 5/1996 |
| WO | WO 96/18275 A1 | 6/1996 |
| WO | WO 98/34164 A1 | 8/1998 |
| WO | WO 98/34359 A1 | 8/1998 |
| WO | WO 98/53573 A2 | 11/1998 |
| WO | WO 98/59256 A2 | 12/1998 |
| WO | WO 98/59257 A1 | 12/1998 |
| WO | WO 99/14885 A2 | 3/1999 |
| WO | WO 99/56143 A1 | 4/1999 |
| WO | WO 99/56144 A1 | 4/1999 |
| WO | WO 99/36795 A1 | 7/1999 |
| WO | WO 99/49677 A1 | 9/1999 |
| WO | WO 00/11893 A1 | 3/2000 |
| WO | WO 01/78249 A1 | 10/2001 |
| WO | WO 01/99295 A2 | 12/2001 |
| WO | WO 02/054694 A1 | 7/2002 |
| WO | WO 03/034235 A1 | 4/2003 |
| WO | WO 03/081373 A2 | 10/2003 |
| WO | 2004/095818 A1 | 4/2004 |
| WO | 2007117892 A2 | 10/2007 |
| WO | WO 2009/149356 A2 | 12/2009 |
| WO | 2010129121 | 11/2010 |
| WO | 2010129122 A2 | 11/2010 |
| WO | 2013/043325 A1 | 3/2013 |

OTHER PUBLICATIONS

Lockwood Technology Corporation, "Asset Management," copyright 2002 by Lockwood Technology Corporation, published on the Internet at http://www.lockwoodtechnology.com/ asset_tracking.html, printed May 29, 2002.

International Search Report PCT/US02/00996; dated Jun. 24, 2002; Applicant: Airbiquity, Inc.

Office Action in U.S. Appl. No. 09/625,159 dated Apr. 9, 2003; 15 pages.

3GPP2 Access Network Interfaces Technical Specification Group, "3GGP2 Access Network Interfaces TSG (TSG-A) #60, Meeting Summary," Coeur d'Alene, Idaho, Apr. 19, 2004, pp. 1-5.

3rd Generation Partnership Project; Technical Specification Group Services and System Aspects Push Architecture (Rel. 6); 3GPP TR 23.976; vol. 3-SA2, No. V6.1.0; Jun. 1, 2004; pp. 1-34.

Universal Mobile Telecommunications System (UMTS); Push Architecture (3GPP TR 23.976 version 6.1.0 Release 6); Jun. 2004; 36 pages.

Protean Research Group, "Anycast Routing for Mobile Services (ARMS) Project Overview," Published on the Internet at <http://tang.itd.nrl.navy.mll/5522/anycast/anycast_index.html>. Downloaded from the internet Jan. 19, 2005.

Vocal Technologies, Ltd. Home Page, "Audio Codecs," http://www.vocal.com/data_sheets/audio_codecs.html?glad, accessed Jun. 12, 2005.

International Search Report for PCT/US06/03416, dated Feb. 5, 2007, 3 pages.

Phifer, Lisa A., Surfing the Web Over Wireless, Jan. 1998, http://www.corecom.com/html/ wireless.html, printed May 22, 2007.

International Preliminary Report on Patentability in PCT/US2006/022985 dated Jan. 3, 2008; 6 pages.

International Search Report of International Application No. PCT/US07/64443, dated Sep. 15, 2008.

USPTO Search Authority; PCT/US08/80555 International Search Report; Dec. 19, 2008, 11 pages.

PCT/US2009/056834 International Search Report dated Dec. 30, 2009; 12 pages.

Supplemental European Search Report for Application 08840726.7 dated Sep. 19, 2012; 8 pages.

International Search Report for PCT/US12/52712 dated Nov. 2, 2012; 4 pages.

Translation of a portion of JP 10-215328 by Sugimura; provided Oct. 11, 2012; 3 pages.

Translation of a portion of JP 10-232138 by Sugimura; provided Oct. 11, 2012; 2 pages.

Translation of a portion of JP 11-312285 by Sugimura; provided Oct. 11, 2012; 1 page.

Translation of a portion of JP 2001-211189 by Sugimura; provided Oct. 11, 2012; 1 page.

Translation of a portion of JP 09-259391 by Sugimura; provided Oct. 11, 2012; 5 pages.

Hissen, Helmut and Zeebar Technology Services, Inc.; DTMF Tones; DialABC—http://web.archive.org/web/20070807103635/http://www.dialabc.com/sound/dtmf.html.; Aug. 7, 2007; 2 pages.

Siwy, Robert; Generation and Recognition of DTMF Signals with the Microcontroller MSP430; Texas Instruments Deutschland GmbH; Oct. 1997; 60 pages.

Digital Cellular Telecommunications System (Phase 2+); GSM 06.31 version 8.0.1 Release 1999. ETSI EN 300 964 V8.01 (Nov. 2000), pp. 1-13. European Standard (Telecommunications serier). (http://www.etsi.org).

Coleman, A., et al., "Subjective Performance Evaluation of the RPE-LTP Codec for the Pan-European Cellular Digital Radio System,"

(56) References Cited

OTHER PUBLICATIONS

Globecom '89, IEEE Global Telecommunications Conference and Exhibition, vol. 2, Nov. 27-30, 1989, pp. 758-761, IEEE, New York, New York.

Coleman, A., et al., "Subjective Performance Evaluation of the RPE-LTP Codec for the Pan-European Cellular Digital Mobile Radio System," Globecom '89, IEEE Global Telecommunications Conference and Exhibition, vol. 2, Nov. 27-30, 1989, pp. 1075-1079, IEEE, New York, New York.

Lin, D., et al., "Data Compression of Voiceband Modem Signals," 40th sup. th IEEE Vehicular Technology Conference: On the Move in the 90's. May 6-9, 1990, pp. 323-325, IEEE, New York, New York.

Feher, "Modems for Emerging Digital Cellular-Mobile Radio System," IEEE Trans. On Vehicular Technology, vol. 40, No. 2, May 1991, pp. 355-365.

Christ, Thomas W., "A Prison Guard Duress Alarm Location System," Proceedings of the IEEE 1993 International Carnahan Conference on Security Technology: Security Technology, Oct. 13-15, 1993, Copyright 1993 IEEE.

Brian W. Martin, "WatchIt: A Fully Supervised Identification, Location and Tracking System," Proceedings of the IEEE, 29th Annual 1995 International Carnahan Conference on Security Technology, Oct. 1995.

Reut, Anton B., "Remote Monitoring of Military Assets Using Commercial Leo Satellites," IEEE Universal Communications Conference Record, Nov. 6-8, 1995, Copyright 1995 IEEE.

Ayanoglu, E., "Adaptive ARQ/FEC for Multitone Transmission in Wireless Networks" Global Telecommunications Conference, 1995. Conference Record. Communication Theory Mini-Conference, Globecom '95., IEEE Singapore Nov. 13-17, 1995, New York, NY, USA, IEEE, US Lnkd. vol. 3. Whole Document.

Brown, et al., "A Reconfigurable Modem for Increased Network . . . " IEEE Trans. On Circuits & Systems for Video Technology, vol. 6, No. 2, Apr. 1996, pp. 215-224.

Jain et al, Potential Networking Applications of Global Positioning Systems (GPS), downloadable at http://www.cis.ohio-state.edu/~jain/papers/gps.htm, pp. 1-40, Apr. 1996.

U.S. Appl. No. 60/047,034; dated May 19, 1997; Applicant: Preston.
U.S. Appl. No. 60/047,140; dated May 20, 1997; Applicant: Preston.
U.S. Appl. No. 60/048,369; dated Jun. 3, 1997; Applicant: Preston.
U.S. Appl. No. 60/048,385; dated Jun. 3, 1997; Applicant: Preston.
U.S. Appl. No. 60/055,497; dated Aug. 13, 1997; Applicant: Preston.

Mueller, A.J. et al., "A DSP Implemented dual 9600/7200 BPS TCM Modem for Mobile Communications Over FM Voice Radios," Proceedings of the 1997 6th IEEE Pacific rim Conference on Communications, Computers and Signal Processing, vol. 2, Aug. 20-22, 1997, pp. 758-761, IEEE, New York, New York.

Werb, Jay and Colin Lanzl, "Designing a Positioning System for Finding Things and People Indoors," IEEE Spectrum, Sep. 1998.

FCC E911 Order, CC Docket No. 94-102; dated Nov. 23, 1998-Jul. 1, 1999.

Werb, Jay and Colin Lanzl, "The Next Generation of Control: Local Positioning," abstract, Feb. 1999, vol. 26.

Lemke A. C., et al.: "Voice Over Data and Data Over Voice: Evolution of the Alcatel 1000. Seamless Evolution of the Alcatel 1000 Switching System will Support the Move to Voice and Data Convergence." Electrical Communication, Alcatel. Brussels, BE, Apr. 1, 1999. Abstract; Figure 2.

Benelli G., et al.: "A Coding and Retransmission Protocol for Mobile Radio Data Transmission." Vehicular Technology Conference, 1999. VTC 1999-Fall. IEEE VTS 50th Amsterdam Netherlands Sep. 19-22, 1999. Abstract Section II.

Vaha-Sipila, A., URLs for Telephone Calls, Request for Comments: 2806, Network Working Group, Apr. 2000, 16 pages.

International Search Report PCT/US00/13288; dated May 15, 2000; Applicant: Integrated Data Communications Inc.

International Search Report PCT/US00/01157; dated May 23, 2000; Applicant: Integrated Data Communications Inc.

Lavigne, R.E. and P. Eng, "Trunking Versus Conventional Radio System," Proceedings of the IEEE, 34th Annual 2000 International Carnahan Conference on Security Technology, Oct. 23-25, 2000.

International Search Report PCT/US01/19845; dated Jun. 22, 2001; Applicant: Airbiquity, Inc.

International Search Report PCT/US01/20021, dated Aug. 21, 2001; Applicant: Airbiquity, Inc.

International Search Report PCT/US01/27238; dated Aug. 30, 2001; Applicant: Airbiquity, Inc.

Bilbao, Alfonso, m-Security (Security and Mobile Telephony), Proceedings of the IEEE 35th Annual 2001, International Carnahan Conference on Security Technology, Oct. 16-19, 2001.

Office Action in U.S. Appl. No. 09/677,486 dated Oct. 16, 2001; 9 pages.

McNichols, Shawn, "Keeping Your Assets Safe," published on the Internet at http://www.securitymagazine.com,CDA/ArticleInformation/features/BNP_Features, posted Feb. 14, 2002, Copyright 2001-2002 by Business News Publishing Co.

"Tracking," published on the Internet at http://www.wisetrack.com/tracking.html, posted May 29, 2002, Copyright 2001 by TVL, Inc.

Janus Technologies, Inc., "ProxTrak Asset Tracking Interface," copyright 2000 Janus Technologies, Inc., published on the Internet at http://www.janus-tech.com/Products/ProxTrax.html, printed May 29, 2002.

Mark Werner et al., Cellular In-Band Modem Solution for eCall Emergency Data Transmission, Vehicular Technology Conference, 2009 VTC Spring 2009, IEEE 69th, Apr. 2009, p. 1-6.

Nortel, FEC Code block-based CRC, 3GPP TSG-RAN WG1#50 R1-73310, Aug. 17, 2007.

Ayanoglu, Ender, Adaptive ARQ/FEC for Multitone Transmission in Wireless Networks, Global Telecommunications Conference, U.S. IEEE, Nov. 13, 1995, V3, P2278-2283.

International Search Report and Written Opinion for PCT/US2010/029937, dated Oct. 28, 2010 (15 pages).

International Search Report and Written Opinion for PCT/US2010/029920 dated Oct. 28, 2010 (13 pages).

\* cited by examiner

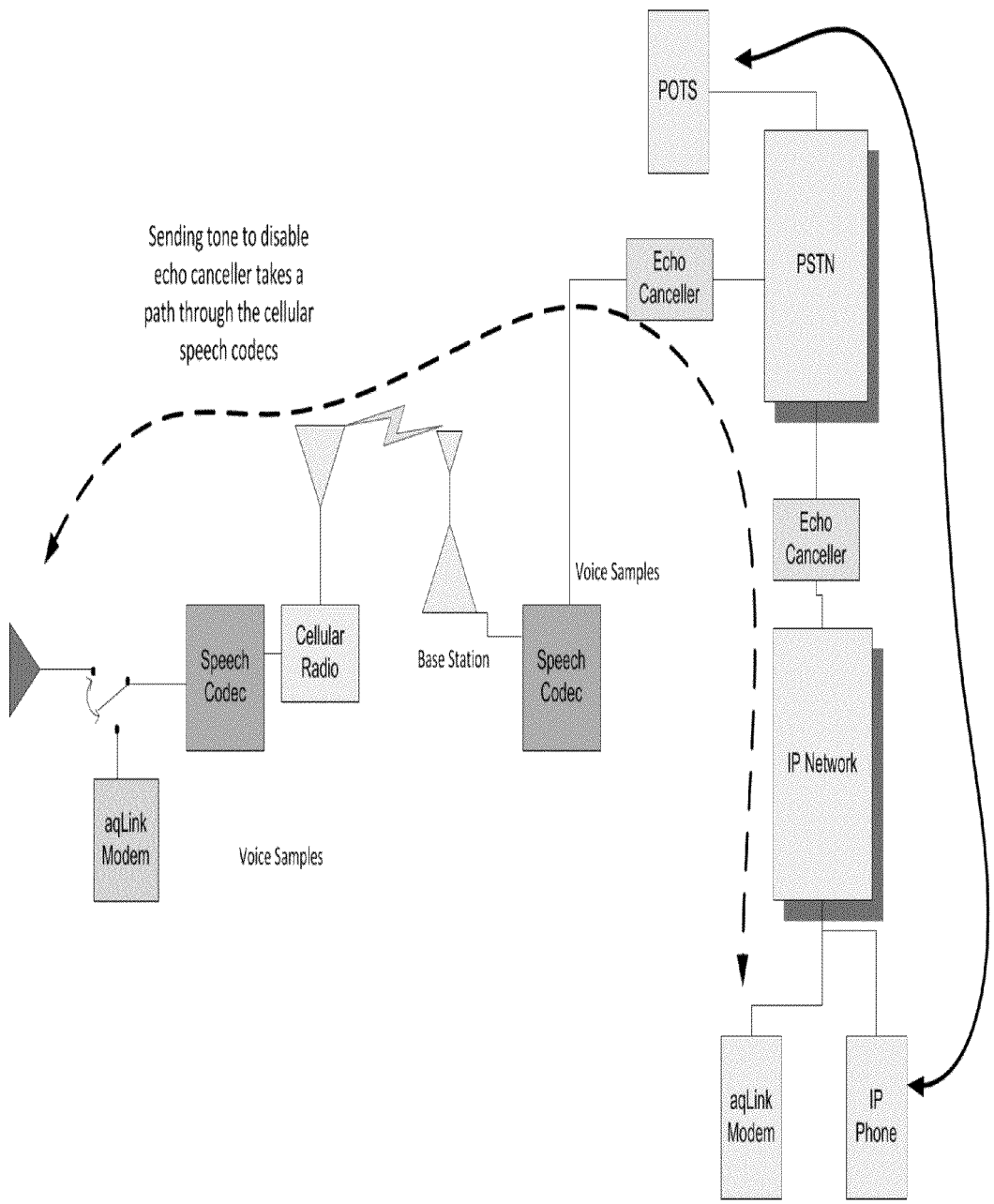

ECHO CANCELLATION IN WIRELESS INBAND SIGNALING MODEM

RELATED APPLICATIONS

None.

COPYRIGHT NOTICE

©2011 Airbiquity Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This application is related to telecommunications and more specifically to improvements for "in band" signaling of data during a voice channel call.

BACKGROUND OF THE INVENTION

Many telecommunication components used in cellular and landline telephone networks are designed to efficiently transmit voice signals over voice communication channels. For example, a digital voice coder (vocoder) uses linear predictive coding techniques to represent voice signals. These linear predictive coders filter out noise (non-voice signals) while compressing and estimating the frequency components of the voice signals before being transmitted over the voice channel.

It is sometimes desirable to transmit both audio signals and digital data over a wireless telecommunications network. For example, when a cellular telephone user calls "911" for emergency assistance, the user may wish to send digital location data to a call center over the same channel used to verbally explain the emergency conditions to a human operator. However, it can be difficult to transmit digital data signals over the voice channel of a wireless network because such signals are subject to several types of distortion.

For example, a digital data signal traveling over the voice channel of a wireless network can be distorted by vocoder effects caused by the voice compression algorithm. In addition, digital data signals can be distorted by network effects caused by poor RF conditions and/or heavy network traffic. Another problem that can interfere with or degrade in-band data signaling is echo cancellation or echo suppression. Echo cancellation is commonly implemented in the fixed or "land line" telecommunications networks (PSTN or VOIP) to prevent or mitigate audible echo during speech conversations.

BRIEF DESCRIPTION OF THE DRAWING

The drawing FIGURE is a conceptual diagram to illustrate the pathways that a voice call can take in a cellular and fixed line/VOIP network.

DETAILED DESCRIPTION OF PREFERRED EMBODIMENTS

Echo Cancellation and Echo Suppression

"Echo cancellers" try to estimate the echo signal coming from the landline network and then try to actively cancel it out. When its working correctly, it will allow both people on the voice call to talk at the same time, and neither one will hear an echo of his/her own voice.

"Echo suppressors" are more primitive. They solve the echo problem by allowing only one person to talk at a time. Whenever an echo suppressor detects signal energy in one direction, it completely squelches the other direction until the speaker stops talking. This guarantees that the speaker will not hear any echo of his/her own voice, but he/she also can't hear any interruptions from the other speaker. Echo suppressors are an old technology, but they are still deployed in some networks.

ITU G.164 requires echo *suppressors* to disable themselves when they detect a 2100-Hz tone. ITU G.165 extends G.164. It requires echo *cancellers* to disable themselves when they detect a 2100-Hz tone with phase reversals. (A 2100-Hz tone with phase reversals is sufficient to disable both G.165-compliant echo cancellers and G.164-compliant echo suppressors.) ITU G.168 is the most recent standard. It incorporates the requirements of both G.164 and G.165.

The ITU G.168 specification was developed to address and standardize the performance of echo cancellers in the PSTN. This specification strictly limits the convergence time, allowed residual echo, tolerance for varying signal levels, and allowed divergence in the presence of destabilizing narrowband energy. It also specifies the required performance of any additional non-linear processing such as clamping and/or suppression, ability to handle data communication, and disabling signals such as the modem 'ANSam' tone. Typically a line echo canceller is implemented in software executable in a processor such as a DSP.

The drawing figure is a conceptual diagram to illustrate the pathways that a voice call can take in a cellular and fixed line/VOIP network. Echo cancellers (or echo suppressors) are typically located in the network as shown.

The dashed line in the figure indicates the path that in-band modem data and voice take through the network; the solid line shows the path that a voice call can take through the PSTN and/or a VOIP network. A fax modem, for example, on the PSTN/VOIP network would transmit the ITU-G.168 disable tone to deactivate the echo cancellers. The disable tone, when transmitted by the in-band modem, would traverse a path going through the speech codecs.

Conventional data modems operate very differently from in-band modems designed for wireless networks. In both cases, data is encoded as audio tones. A conventional modem transmits the tones directly over the PSTN voice services. In prior art, a conventional modem may send a tone over the PSTN to disable echo cancellation in the network as described in ITU G.168.

Repeat disable tone per burst

When a typical landline (e.g. V-series) modem makes a phone call, it will transmit some kind of signal continuously for the entire duration of the call. It never pauses, and it never relinquishes the line until the call is terminated. In some embodiments of an in-band signaling modem designed for wireless networks, a different approach is used. It transmits in bursts that are separated by periods of silence. And sometimes it relinquishes the line so that human users can have a voice conversation on the same call.

The G.168 spec requires a compliant echo canceller in the network to detect the 2100-Hz disabler tone. Upon detecting the tone, the echo canceller disables itself and becomes transparent to the audio signals that pass through it. However, the G.168 spec also requires it to *re-enable* whenever it detects a break in the modem transmission, i.e. when the signal energy level falls below a certain threshold for a certain amount of time. (The idea here is that the echo canceller can recover from false detections of the 2100-Hz disabler tone.)

This re-enabling won't affect a typical landline modem, because a typical landline modem never stops transmitting. Such a modem can play the 2100-Hz disabler tone *once* at the beginning of the phone call and never have to play it again. Our in-band modem designed for wireless networks, on the other hand, transmits in bursts separated by periods of silence. Therefore we preferably play the 2100-Hz disabler tone at the beginning of each burst to ensure that the echo canceller is disabled for each and every burst. This may be called a dynamic application of disabling echo cancellation or echo suppression.

Digital processor and associated memory

As mentioned above, the invention may be implemented in an in-band signaling mode. In many cases, the modem is realized in a digital computing system. By the term digital computing system we mean any system that includes at least one digital processor and associated memory, wherein the digital processor can execute instructions or "code" stored in that memory. (The memory may store data as well.) A digital processor includes but is not limited to a microprocessor, multi-core processor, DSP (digital signal processor), processor array, network processor, etc. A digital processor may be part of a larger device such as a laptop or desktop computer, a PDA, cell phone, iPhone PDA, Blackberry® PDA/phone, or indeed virtually any electronic device.

The associated memory, further explained below, may be integrated together with the processor, for example RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" in that they are readable by a suitable digital processor as further explained below for the benefit of the US PTO.

Storage of Computer Programs

As explained above, the present invention preferably is implemented or embodied in computer software (also known as a "computer program" or "code"; we use these terms interchangeably). Programs, or code, are most useful when stored in a digital memory that can be read by a digital processor.[1] We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, mini-computer, desktop or even laptop computer. Rather, we use the term to mean that the storage medium is readable by a digital processor or any digital computing system. Such media may be any available media that is locally and/or remotely accessible by a computer or processor, and it includes both volatile and non-volatile media, removable and non-removable media.

[1] In some cases, for example a simple text document or "flat file," a digital computing system may be able to "read" the file only in the sense of moving it, copying it, deleting it, emailing it, scanning it for viruses, etc. In other words, the file may not be executable on that particular computing system (although it may be executable on a different processor or computing system or platform.

Computer Program Product

Where a program has been stored in a computer-readable storage medium, we may refer to that storage medium as a computer program product. For example, a portable digital storage medium may be used as a convenient means to store and transport (deliver, buy, sell, license) a computer program. This was often done in the past for retail point-of-sale delivery of packaged ("shrink wrapped") programs. Examples of such storage media include without limitation CD-ROM and the like. Such a CD-ROM, containing a stored computer program, is an example of a computer program product.

It will be obvious to those having skill in the art that many changes may be made to the details of the above-described embodiments without departing from the underlying principles of the invention. The scope of the present invention should, therefore, be determined only by the following claims.

The invention claimed is:

1. An in-band signaling modem comprising:
a processor configured to—
  receive digital user data for transmission to a remote location;
  convert the user data into audio tones for transmission;
  encode the audio tones into digital form suitable for transmission through a voice channel call session of a digital wireless network;
  establish a voice channel call session on a digital wireless network;
  and then transmit the user data audio tones to the remote location in a series of bursts using the established voice channel call session, the transmit step including, at the beginning of each burst, disabling any echo cancellation or echo suppression means that may be encountered in the voice channel call session; and
  wherein said disabling the echo cancellation or echo suppression means comprises transmitting a predetermined tone at the beginning of each burst.

2. An in-band signaling modem comprising:
a processor configured to—
  receive digital user data for transmission to a remote location;
  convert the user data into audio tones for transmission;
  encode the audio tones into digital form suitable for transmission through a voice channel call session of a digital wireless network;
  establish a voice channel call session on a digital wireless network;
  and then transmit the user data audio tones to the remote location in a series of bursts using the established voice channel call session, the transmit step including, at the beginning of each burst, disabling any echo cancellation or echo suppression means that may be encountered in the voice channel call session; and
  wherein said disabling the echo cancellation or echo suppression means comprises transmitting a predetermined tone consistent with ITU standard G.168 at the beginning of each burst.

3. An in-band signaling modem comprising:
a processor configured to—
  receive digital user data for transmission to a remote location;

convert the user data into audio tones for transmission;
encode the audio tones into digital form suitable for transmission through a voice channel call session of a digital wireless network;
establish a voice channel call session on a digital wireless network;
and then transmit the user data audio tones to the remote location in a series of bursts using the established voice channel call session, the transmit step including, at the beginning of each burst, disabling any echo cancellation or echo suppression means that may be encountered in the voice channel call session; and
wherein the processor is configured to play a selected audio frequency tone at the beginning of each burst to disable the echo cancellation or echo suppression means that may be encountered in the voice channel call session.

4. The in-band signaling modem of claim 3 wherein the processor is further configured to: separate each burst from a subsequent burst by a period of silence.

5. The in-band signaling modem of claim 4 wherein recovering the user digital data includes distinguishing a predetermined audio frequency tone that is used to disable echo cancellation or echo suppression means.

6. A computer-readable, non-transitory medium storing a series of instructions executable in a digital processor, the instructions arranged to cause the processor to—
receive digital user data for transmission to a remote location;
convert the user data into audio tones for transmission;
encode the audio tones into digital form suitable for transmission through a voice channel call session of a digital wireless network;
establish a voice channel call session on a digital wireless network to the remote location;
transmit the user data audio tones to the remote location in a series of bursts using the established voice channel call session; the transmit step including
transmitting a predetermined tone at the beginning of each burst, the tone having characteristics selected to disable an echo cancellation or echo suppression means.

7. The computer-readable, non-transitory medium of claim 6 wherein the predetermined tone has characteristics consistent with ITU standard G.168.

8. The computer-readable, non-transitory medium of claim 7 wherein the processor is configured to disable the echo cancellation or echo suppression means at the beginning of each burst so that any echo cancellation or echo suppression means that may be encountered in a PSTN or IP network intermediate the digital wireless network and the remote location will be disabled to avoid corrupting the original digital user data.

9. The computer-readable, non-transitory medium of claim 6 wherein the stored instructions cause the processor to insert a silent period after each data burst during the call session.

10. The computer-readable, non-transitory medium of claim 6 wherein said disabling the echo cancellation means or echo suppression means comprises transmitting the predetermined tone at the beginning of each burst with phase reversals.

11. A method comprising:
receiving digital user data for transmission to a remote location;
converting the user data into audio tones for transmission;
encoding the audio tones into digital form suitable for transmission through a voice channel call session of a digital wireless network;
establishing a voice channel call session on a digital wireless network;
and then transmitting the user data audio tones to the remote location in a series of bursts using the established voice channel call session;
the transmit step including transmitting a predetermined tone at the beginning of each burst, the tone having characteristics selected to disable an echo cancellation or echo suppression means so that the echo cancellation or echo suppression means will not degrade or interfere with subsequent decoding of the audio tones at the remote location to recover the digital user data.

12. The method of claim 11 wherein the predetermined tone is consistent with ITU standard G.168.

13. The method of claim 11 wherein the tone has a nominal frequency of 2100 Hz.

14. The method of claim 11 including transmitting the tone with phase reversals.

15. The method of claim 11 wherein the method is implemented in software executable in a digital signal processor.

* * * * *